(12) United States Patent
Sridhara et al.

(10) Patent No.: US 8,978,057 B2
(45) Date of Patent: Mar. 10, 2015

(54) INTEROPERABILITY OF SET TOP BOX THROUGH SMART CARD

(75) Inventors: Kasa Sridhara, New Delhi (IN); Padur Vadiraja Acharya, Electronic (IN); Dutta Pallab, Electronic (IN); Ravichandran Bharat, Electronic (IN)

(73) Assignee: Centre For Development Of Telematics, Bangalore (IN)

( * ) Notice: Subject to any disclaimer, the term of this patent is extended or adjusted under 35 U.S.C. 154(b) by 94 days.

(21) Appl. No.: 13/141,036

(22) PCT Filed: Apr. 13, 2010

(86) PCT No.: PCT/IN2010/000237
§ 371 (c)(1),
(2), (4) Date: Jun. 20, 2011

(87) PCT Pub. No.: WO2010/119453
PCT Pub. Date: Oct. 21, 2010

(65) Prior Publication Data
US 2011/0252440 A1    Oct. 13, 2011

(30) Foreign Application Priority Data
Apr. 13, 2009 (IN) .............................. 843/CHE/2009

(51) Int. Cl.
| | |
|---|---|
| H04N 7/16 | (2011.01) |
| H04N 7/167 | (2011.01) |
| H04N 21/418 | (2011.01) |
| H04N 21/436 | (2011.01) |
| H04N 21/4367 | (2011.01) |
| H04N 21/4623 | (2011.01) |
| H04L 9/32 | (2006.01) |

(52) U.S. Cl.
CPC ........... *H04N 7/163* (2013.01); *H04N 21/4181* (2013.01); *H04N 21/43607* (2013.01); *H04N 21/4367* (2013.01); *H04N 21/4623* (2013.01); *H04L 9/3234* (2013.01); *H04L 9/3273* (2013.01)
USPC ................... 725/31; 725/25; 725/26; 725/27; 725/28; 725/29; 725/30

(58) Field of Classification Search
USPC ......... 725/68, 85, 100, 110, 131, 151, 25, 27, 725/28, 29, 30, 31; 380/200–240
See application file for complete search history.

(56) References Cited

U.S. PATENT DOCUMENTS

| | | | |
|---|---|---|---|
| 7,299,362 B2 | 11/2007 | Shen et al. ..................... | 713/189 |
| 2003/0059047 A1* | 3/2003 | Iwamura ....................... | 380/201 |
| 2004/0086127 A1* | 5/2004 | Candelore ..................... | 380/281 |
| 2006/0175259 A1 | 8/2006 | Kim et al. ......................... | 725/6 |
| 2008/0010663 A1 | 1/2008 | Wang et al. .................... | 725/133 |

OTHER PUBLICATIONS

International Search Report WO 2010/119453 dated Oct. 21, 2010 for related PCT Patent Application No. PCT/IN2010/000237.

\* cited by examiner

*Primary Examiner* — Pankaj Kumar
*Assistant Examiner* — Alazar Tilahun
(74) *Attorney, Agent, or Firm* — Ladas & Parry, LLP

(57) ABSTRACT

The concept of profiling the STB (01) through the Smart Cards (02) as per the service provider specific requirements makes towards interoperability. Smart cards (02) are embedded with greater operator specific intelligence. The scheme used in the present invention mainly focuses on downloading of profiling data from smart card (02) to the STB (01) and pushing CAS implementation fully from STB to Smart card (02).

18 Claims, 3 Drawing Sheets

INTEROPERABILITY OF SET TOP BOX THROUGH SMART CARD

CROSS-REFERENCE TO RELATED APPLICATIONS

This application is the U.S. National Stage of International Patent Application No. PCT/IN2010/000237 filed on Apr. 13, 2010, which claims priority to Indian Patent Application No. 843/CHE/2009 filed on Apr. 13, 2009, the disclosures of which are hereby incorporated by reference in their entireties.

FIELD OF THE INVENTION

The present invention is related to interoperability of set top box through smart card.

BACKGROUND OF THE INVENTION

In digital Direct to Home (DTH) system, the receiver in the customer premise consists of an antenna, a STB (Set Top Box) and a detachable Smart Card. Due to various technical, implementation and market driven reasons, the STB is tied to the service operators. That is, the same STB cannot be used interchangeably across the service providers of DTH services. This vertical market structure has disadvantages for end users and for service providers entering the market. End users would benefit from a horizontal market of open/interoperable systems, where devices and services can be obtained from several different providers.

Presently STBs are tied to the service provider; same STB cannot be used for receiving programs from different service provider. Smart cards are service providers specific complying with ISO/IEC 7816-1, 2, 3 Standards. That is all smart cards comply with the same physical and electrical characteristics. However the communication protocol between the Smart card and the STB is proprietary. One of the main hindrances to STB interoperability is that the Conditional Access schemes are different for different service providers and the implementation of STBs are specific to the conditional access methods. The CAS (Conditional Access System) is implemented partly in STB and partly in the Smart Card. Due to this reason the STBs are tied to the specific CAS and the service provider.

DETAILED DESCRIPTION OF INVENTION

Figure 1:
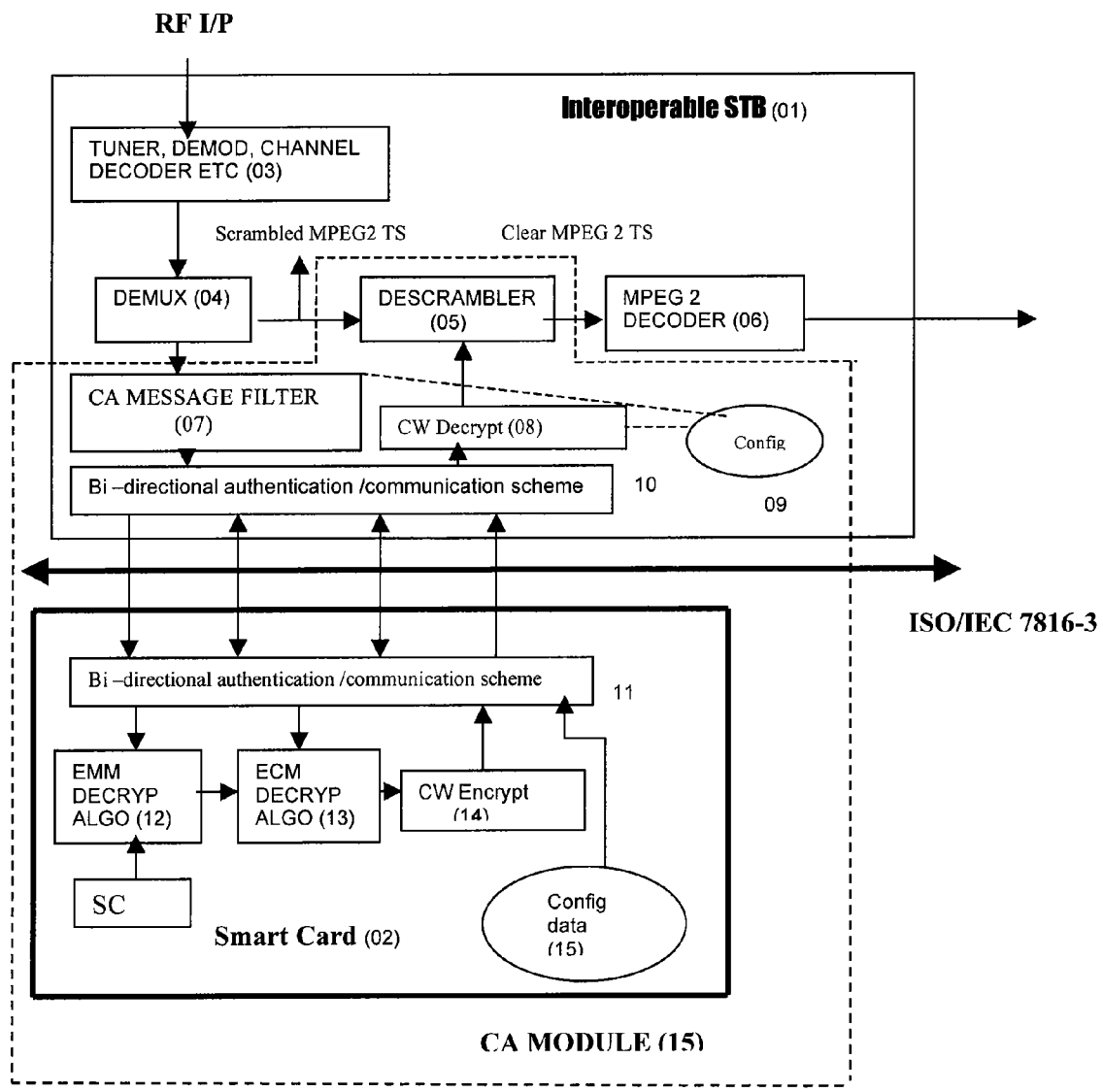
FIG. 1 shows the architecture of interoperable STB.

The primary embodiment of the invention is a system for interoperability of set top box (STB) (01) through smart cards, said system comprises a set top box (01) comprising bi-directional authentication block to mutually authenticate with operator specific smart card (02); config block (09) to receive profiling data from smart card (02), wherein said profiling data configures conditional access (CA) filter; demodulator block to receive input streams; CA filter to extract conditional access messages from the input streams and send extracted messages to smart card (02); control word decrypt block to decrypt control word received from the smart card (02); and smart card (SC) (02) connected to the STB (01), wherein said SC comprises config data block (15) to store and to send out predefined operator specific profiling data to the STB (01); decrypt block to decrypt the extracted messages from the STB (01) to generate control word (CW), said CW is encrypted and sent to the STB (01) to descramble the input streams.

In still another embodiment of the present invention the conditional access messages comprises entitlement management message (EMM), entitlement control message (ECM) and optionally private data.

In still another embodiment of the present invention the decrypt block of the SC comprises EMM decrypt to decrypt entitlement management messages, ECM decrypt to decrypt entitlement control messages along with decoding of private data to derive control word.

In still another embodiment of the present invention the SC comprises CW encrypt block to receive data from decrypt blocks and generate encrypted control word.

In still another embodiment of the present invention configuring the CA filter is carried out based on service provider specific context.

Another embodiment of the present invention is a method for interoperability of set top box (STB) using smart card (02), said method comprises acts of establishing secure bi-directional communication channel between set top box (STB) and smart card (SC) by mutual bi-directional authentication protocol and dynamic session key establishment; receiving profiling data by the STB (01) from the SC using the channel; configuring conditional access (CA) filter of the STB (01) using the profiling data; extracting of conditional access messages from input streams by the STB (01) using the CA filter, wherein the extracted messages are transferred to the SC; decrypting the extracted messages by the SC to generate control word (CW), wherein said CW is encrypted; and receiving and decrypting the encrypted CW by the STB (01), wherein the decrypted CW is used as a key to carry out audio and video descrambling.

In yet another embodiment the authentication protocol comprises user password and time stamping to enhance security.

In still another embodiment configuring conditional access filter is service provider specific context.

In still another embodiment communication between the STB (01) and the smart card (02) comprises bidirectional authentication, secure channel establishment, CA message transfer, universal CA filter design for extracting the CA messages.

In still another embodiment the conditional access messages comprises entitlement management message and entitlement control message and optional private data (PD).

In order to overcome the aforementioned drawbacks in the background, the present invention discloses interoperability of set top box through smart cards. The exponential increase in the smart card (SC) processing power & memory capacity (in SC) and decreasing price gives an impetus and catalyses the concept of profiling the STB (01) through the SCs as per the service provider specific requirements towards interoperability. Smart cards are embedded with greater operator specific intelligence. For attaining interoperability, one obvious approach is to standardize all interfaces/functions, but such blanket standardization has its own pitfalls. So far as conditional access is concerned, any standardization reduces the security of the system. The present invention downloads profiling data from smart card (02) to the STB (01) and pushing CAS implementation fully from STB (01) to Smart card (02). The STB (01) shall have limited configurable features to support the operator specific requirements. The STB (01) is not to be tied to any specific service operator and the same time cannot be fully generic configurable platform with the superset capabilities given the constrains of customer premise equipment. The profiling requirements shall be such that the profiling data/functionality is minimal.

The present invention provides configuring of STB (01) to the required context of service operator, the STB (01) shall be configured according to the given context/operating environment by the intelligent Smart cards so that the required CA messages can be filtered and sent to the SC for further processing. A lightweight communication protocol between STB (01) and SC with setup messages, information transfer messages, termination and error messages is part of the invention. Bi-directional authentication scheme, configurable mild encryption channel establishment, a universal filter design for extracting the conditional access messages from the MPEG 2 streams for different service providers is provided in this invention. Thus, the STB (01) is configured through the corresponding service provider's SC so that the same can be used for receiving services from any service provider.

Figure 2:
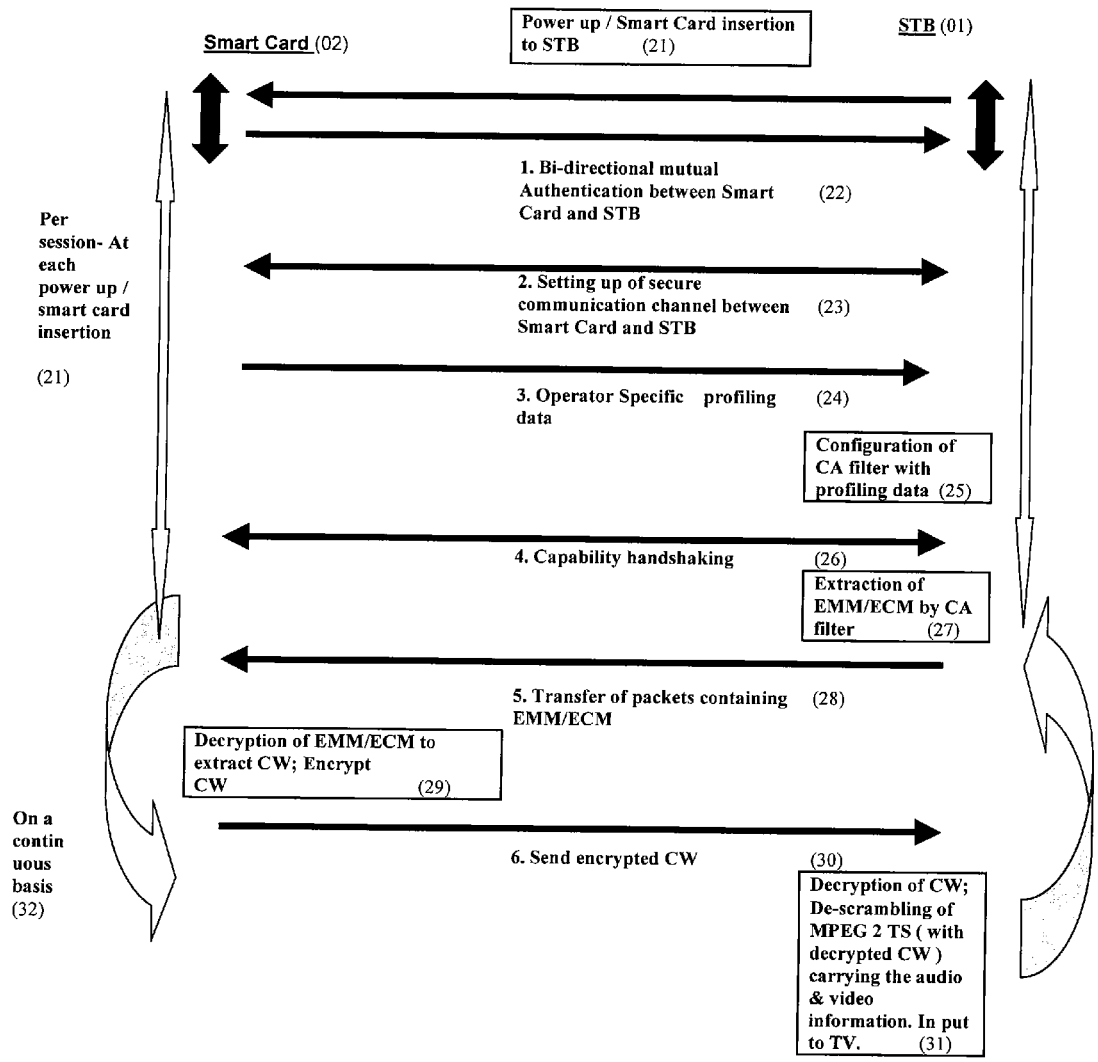
FIG. 2 shows the high level message sequence for interoperable STB.

FIG. 1 shows the architecture of interoperable STB (01). FIG. 2 shows the high level message sequence for interoperable STB (01).

The following are the modules for attaining CA Interoperability of STB (01) as shown in the FIG. 1:
  Bi-directional authentication scheme between STB (01) and Smart card (02).
  Safe Channel establishment between SC and STB (01)
  Profiling data exchange
  Configurable CA filter (07)
  Communication protocol between STB (01) and SC (02).

The following are the requirements of Bi-directional authentication scheme between STB (01) and SC (02):

DTH STB is a one way broadcast system, so the authentication protocols used in two-way communication system are not applicable in this case. No return channel exists here. In DTH STB scenario, both STB and smart cards may be fake. The fake STB [in the form of a smart card reader] may be used to capture information from a valid Smart card (02) and that information may be misused to produce fake/cloned smart cards. Therefore, bi-directional mutual authentication where SC authenticates to STB and STB authenticates to SC is required. The authentication scheme needs to be an open specification for it to be applicable in interoperable STB scenario.

In the existing CAS systems, for the purpose of authentication, predefined secret key of STB (01) is placed inside the smart card (02) during the smart card (02) registration phase [just before issuing the smart card (02) to the specific user]. This is a major hindrance to interoperability. By using the secret information of STB (01) in SC, interoperability cannot be attained, as the objective is to use any STB with any operator Smart card (02).

A control word (CW) derived by the SC from the EMM/ECM shall not be sent as a clear data to STB (01). Otherwise CW can be tapped and used in many STBs to receive the pay TV signals. This is known as McCormac Hack and shall be prevented through security mechanism. Because of the interoperability requirements, the encryption algorithm will be standardized and the security of the system relies on the key to algorithm. So to prevent the possibility of breaking the key using any brute force methods shall also be taken care.

For attaining interoperability, the communication scheme [including authentication scheme etc.] between STB (01) and SC are standardized. This increases the security threat and hence superior security scheme shall be incorporated to enhance/maintain the same level of security as in the proprietary non-interoperable system. The authentication scheme shall be resistant to 'man-in-middle' attack and 'replay' attack. Unlike the two way communication system, here the content is of interest to all (the commercial value attached to the content is very high) and so it is more likely that it will be attacked by the hackers, hence the security requirements are more stringent here.

Although SCs have dedicated coprocessors for performing various mathematical computations required for authentication algorithms; SCs have limited resources as compared to high-end servers. Hence the authentication scheme is such that the computations required to be performed by the SC will be within the computational power of Smart card. Also SCs are expected to perform the required computations with in a reasonable time. Also, it is required that the system has personal security in the sense that an unauthorized person who gets access to a valid SC (by stealing the valid SC) shall not be permitted to use the smart card (02) for viewing channels even with a certified STB.

In a one-way broadcast network, it is difficult to detect any unauthorized reception of the signal. The bi-directional authentication protocol of the present invention is to satisfy the above requirements. The method used is based on digital signature and digital certificate concepts along with preprocessing optimization specifically suitable to smart card applications.

The following features enhance the security of the system:
The protocol used in the present invention has individual user password for end user (subscriber) authentication with the provision for password change. Also time stamping is used to enhance the security and robustness of the protocol.

The first phase involves the trusted authority (TA), which has a pair of public/private keys ($pk_A$, $sk_A$), STB manufacturer, and DTH operator (OP) which also functions as secondary trusted authority. The first phase is the registration phase which involves the following steps:

1. TA generates a identification string $I_S$, a pair of public/private keys ($pk_S$, $sk_S$), and the corresponding public key certificate $C_A(I_S)=I_S$, $pk_S$, $sig_A(I_S, pk_S)$ for each STB (01), where $sig_A(I_S, pk_S)$ denotes TA's signature on the message $I_S$, $pk_S$ with private key $sk_A$. Then TA safely delivers $pk_A$ and $sk_S$, $C_A(I_S)$ to the STB manufacturer by a trust carrier or through a secure channel between TA and STB manufacturer.

2. The STB manufacturer places the set of the messages $pk_A$, $C_A(I_S)$, $sk_S$ into the secure memory of each STB (01) at the stage of producing STB (01).

3. The TA generates a unique identification string $I_O$, pair of public/private keys ($pk_O$, $sk_O$), and a public-key certificate $C_A(I_O)=I_O$, $pk_O$, $sig_A(I_O, pk_O)$ for each OP. The TA safely delivers the set of messages $pk_A, C_A(I_O)$, $sk_O$ to each OP.

4. The OP chooses the parameters p, q, and $\alpha$ (Primes p and q such that q|p−1, q≥$2^{140}$, and p≥$2^{512}$. $\alpha \in Zp$, i.e.$\alpha^q=1 \bmod p$, $\alpha \neq 1$, Zp={0, 1, . . . , p−1}). Further, the OP selects a symmetric encryption algorithm Ek(•) such as triple DES, an asymmetric encryption algorithm Epk(•) such as RSA, and a secure hash algorithm h(•) such as SHA-1.

5. For each SC (02), the OP assigns a unique identification string $I_C$, generates a random number u<q as private key, computes the public-key $v=\alpha^{-u} \bmod p$, and creates the corresponding public-key certificate $C_O(I_C)=(I_C$, v, $\alpha$, p, $sig_O(I_C$, v, $\alpha$, p)). Then, OP stores $pk_A$, $C_O(I_C)$, $pk_O$, u, Ek(•), Epk(•), PW and h(•) in each SC. PW is user password. The user password PW is sent to the user through a secured channel.

6. For the first time use, STB (01) downloads the OP's public-key certificate $C_A(I_O)$, the secure hash algorithm h(•), the encryption algorithms Ek(•) and Epk(•), and the OP's signatures on both Ek(•) and Epk(•). Then, STB (01) use $pk_A$ to verify the certificate $C_A(I_O)$ and uses $pk_O$ contained in $C_A(I_O)$ to verify the OP's signatures on both Ek(•) and Epk(•). If the result of all verifications is positive, STB (01) stores $pk_O$, Ek(•), Epk(•) and h(•) into its own memory.

The next phase is Communication phase with the following steps:

7. User password PW1 is entered using a remote.
8. STB (01) sends the certificate $C_A$ ($I_S$) and user password PW1 to SC (02).
9. SC (02) verifies the password PW1 with PW and certificate $C_A$ ($I_S$) using the TA's public-key $pk_A$. If the result of both the verifications are positive, SC (02) generates a random number $a \in \{1, \ldots, q\}$, a random nonce r1, and a random session key K, computes $b = \alpha^a \mod p$, encrypts b and r1 with K to get EK(b, r1), encrypts K with STB's (01) public key $pk_S$ to get $Epk_S(K)$, and sends $Epk_S(K)$, EK(b, r1), and its own public-key certificate $C_O(I_O)$ to STB (01).
10. STB (01) verifies the certificate $C_O(I_C)$ using the public key $pk_O$. If the result of the verification is positive, STB (01) decrypts $Epk_S(K)$ with its private key $sk_S$ to get the r1, creates a random nonce r2 and a random number $m \in \{0, \ldots, 2^t-1\}, t=72$, encrypts m, r1, and r2 with session key K to get EK(m, r1, r2), and sends EK(m, r1, r2) to SC.
11. SC (02) decrypts EK(m, r1, r2) with the session key K to get m, r1, and r2, checks r1 agree with that sent in Step (9), computes $M=h(m, I_C, I_S)$ and $c=(a+uM) \mod q$, encrypts c and r2 with K to get EK(c,r2), and sends EK(c,r2) to STB (01).
12. Upon receiving the message EK(c,r2), STB (01) decrypts EK(c,r2) with K to get c and r2, checks the number r2 agrees with that sent in Step (10). Provided the result of the check is positive, STB (01) computes $M=h(m, I_C, I_S)$, checks $b=\alpha^c v^M \mod p$ and accepts the identification proof of SC if this equation holds.
13. After successful bidirectional authentication, STB (01) sends real time information to SC timer to initialize its RTC.

The next phase is Password Change Protocol with the following steps:

14. To change the password, the password change request is sent to SC by the user using a remote.
15. SC (02) asks for the existing password. This is displayed on the TV screen.
16. User sends the existing password PW using the remote. This is sent to SC (02) from STB (01) received from remote.
17. SC (02) verifies this password with already stored value. If this matches, SC (02) asks for the new password along with reentry.
18. The new password is entered using the remote and gets registered in the SC (02).
19. The password change protocol is possible only after successful bi-directional authentication. The password change protocol in SC (02) along with bi-directional authentication for an interoperable STB (01) is a unique and one of the most important features of STB (01) and an important invention.

The last phase is Control word transmission with the following steps:

20. Symmetric encryption algorithm E(.) is used for encrypting the control word in SC and sending it to the STB (01). CWK=h (K, r1, r2, T). CWK is the key for the symmetric algorithm. CWK is calculated in the STB (01) immediately after sending RTC value to SC. T=value of RTC at the instant of sending RTC value to SC.
21. SC (02) calculates CWK immediately after receiving RTC value. While calculating CWK in STB (01) and SC (02), the T value is chosen from RTC in such a way that T values are same in both STB (01) and SC (02) i.e. the propagation delay and processing delay are compensated for so that the value of T remains same both at SC (02) and at STB (01).
22. Same CWK value is used for a predefined period (approx. 30 min). After the pre-defined (operator specific, value configured to STB (01) by SC (02) after successful bidirectional authentication) time period expires, STB (01) sends a request to change the CWK with the current/updated RTC value.
23. SC (02) checks the whether the pre-defined period has reached or not. If it is reached SC (02) sends acceptance message and steps 19 and 20 steps are followed.

Secure Channel Between STB and Smart Card (23)

After the successful bi-directional mutual authentication (22) (as shown in the FIG. 2), the EMM/ECM is extracted by STB (01) (27) and sent to Smart card (02). Smart card (02) decrypts EMM/ECM (29) and private data (if present) to get CW and sent to de-scrambler (05) in STB (01) to de-scramble the audio/video signals (30).

The control word (CW) derived by the Smart card (02) from the EMM/ECM and private data shall not be sent as a clear data to STB (01). Otherwise CW can be tapped and used in many STBs to receive the pay TV signals. This is known as McCormac Hack and shall be prevented through security mechanisms. Similarly security sensitive information from STB (01) to Smart card (02) shall be sent through a safe channel.

The present invention also presents, the derivation of a dynamic session key of a priory known symmetric encryption algorithm is unique. The key is highly secured, dynamic and computationally lightweight and specifically suitable in the context of SC and interoperable STB (01). A predefined encryption scheme is used which is symmetric encryption algorithm like triple DES with a dynamic session key. The encryption algorithm is not secret but can be different for different operators from an allowable set. CWK as defined in the authentication protocol is used as the session key for encrypting CW. In order to enhance the security, the session key (CWK) is changed after a predefined period during the operating condition of STB. This can be negotiated between the STB and the smart card (02) after successful mutual authentication (22) after each time STB powers-up/card insertion (21).

In order to have enhanced security, it is extremely important that EMM of the subscribers are sent through a secured channel to SC as EMM contains subscriber specific security data. Given the low frequency of EMM, this is feasible and does not introduce any significant delay/processing overhead. EMMs are encrypted using E(.) with the key K while sending from STB (01) to SC. Here the session key is dynamic and changes each time the STB (01) is powered up and/or SC is inserted. Thus, the method enhances the overall security of the system and makes the interoperable STB (01) a secured platform for the content and service provider.

The operator specific profiling data (24) is stored Smart card (02) by the operator. In this invention, these profiling data is used by STB to attain interoperability as well as helps in enhancing the security of the system. The profiling data is used for two purposes:

These data can be used to configure the CA filter of the STB (01), so that the relevant CA messages along with private data can be sent to Smart card (02) from the STB (01).

Existing capabilities of STB (01) are verified and the mutually supported set of features are agreed upon those can be delivered by the operator using the specific STB (01) are finalized and presented to the customer before the actual delivery of service. Support of type of compression techniques etc. can be decided. This feature is very useful for attaining total interoperability of STB (01).

Two CA specific profiling data as mentioned below are stored in SC by the operator and are used to configure the STB (01).

GN (Group Number): For Filtering of EMMs; Usage of GN is for security enhancement; and Private data location: Filtering of private data from the specified location.

ECMs are per channel and EMMs are per subscriber containing encrypted SKs for all channels the particular subscriber has subscribed for. In a conventional CAS, the EMM for a given subscriber is filtered and sent to SC. In this invention, a number of subscribers (1 to 10) are grouped together and send all EMMs corresponding to the subscribers having the same group number (GN) to the SCs. SC decode only the EMMs meant for that subscriber. The GN and IK (individual key) are kept totally uncorrelated and the mapping is known only to the service provider. GN is to be kept independent of subscriber number.

The EMM structure is as shown below:

| 4 BYTES MPEG2 TS HEADER | 4 BYTES (GN) | 180 BYTES OF OPERATOR SPECIFIC EMM STRUCTURE |
|---|---|---|

The GN is sent from SC to STB (01) after successful bi-directional authentication through safe channel. This marginally increase the BW requirement between STB (01) and SC but enhances the security of the system as the potential attacker/hackers is never sure the EMM is for one or multiple subscriber and unauthorized decoding of EMM through any type of pattern matching becomes that much difficult.

Figure 3:
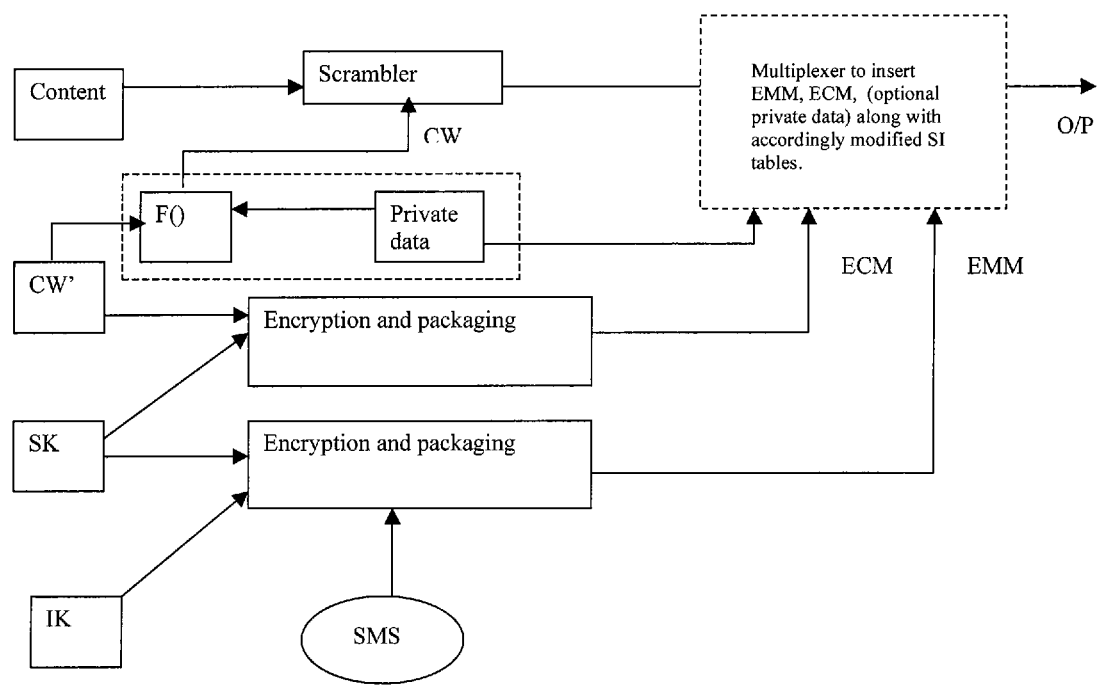
FIG. 3 shows usage of private data for security enhancement in STBs.

Usage of private data for security enhancement is as shown in the FIG. 3. The operator/CAS supplier may enhance the system security by using some private data. This ensures that CAS supplier has enough innovation space, maintains product characteristics and protects its intelligence property. The MPEG-2 TS specification (ISO 13818-1) provides provisions to add private data (other than ECM/EMM). After successful mutual authentication, Smart card (02) tells to the STB (01) whether any private data exists or not; if exists the specific locations for the same is given to STB. The STB 'CA-filter' accordingly configures itself to extract those private data from the received streams and send those to the Smart card (02). The usage (what is done) with the private data in Smart card (02) is known only to the operator Head-end and the valid smart card (02) issued by the operator. This usage information is put in the smart card (02) by the operator during smart card (02) production and never known to the STB (01) or smart card (02). This enhances one more level of security over and above ECM/EMM proprietary logic.

Configurable CA filter (07) is a part of Interoperable STB (01). In this invention, the CA filter is capable of filtering the CA messages, which are relevant for the smart card (02) presently put in the STB (01). That is, each time a different SC is put in the STB (01), the CA filter filters only the corresponding CA messages and sends those CA messages to SC for processing. The CA filter (07) is thus made configurable.

The CA filter is made configurable (25) with respect to the following two parameters:

GN (Group Number): For Filtering of EMMs.

Private data location: Filtering of private data from the specified location.

When the CA filter (07) is configured by the data stored in the SC, the CA filter (07) filters the ECMs/EMMs and 'private data' as required (27). The CA filter configurability is per operator as well as per subscriber basis. 'Private data location' is per operator basis and GN is per group of subscriber basis.

Communication Protocol

The specification used as on date for Digital DTH STB is BIS IS 15377: 2003 from BUREAU OF INDIAN STANDARDS. This specification mandates the adherence to IS 14202 (Parts 1, 2 and 3) for STB—Smart card interface. These IS specifications points to ISO/IEC 7816 (1, 2, 3).

ISO/IEC 7816-1: Gives the physical Characteristics of the cards.

ISO/IEC 7816-2: Gives dimension and location of the cards.

ISO/IEC 7816-3: Gives electrical interface and transmission protocol.

These specifications do not give the message structure to be used between Smart card and STB. To attain interoperability it is mandatory to standardize the message structure. ISO/IEC 7816-4 defines the APDU (Application protocol data unit) structure and the 'INS' values. There are 105 'INS' (Instruction byte) values defined in ISO/IEC 7816-4. "INS' is 8 bits. Hence the total number of different values those may be defined for 'INS' are 256. In order to use faster processing of APDUs, all the different messages those are used for communication between STB and SC are given different 'INS' values and defined accordingly.

In the present invention, the processing speed increases drastically as it is not required to define a message structure on the data filed of the APDU, the decoding of the messages takes place at the 'INS' level only and thus reduces the processing delay and also gives better bandwidth optimization. This invention is also important from the aspect of achieving STB interoperability with minimum changes in the message structure. These messages are of three types:

Authentication messages

ECM/EMM/PD messages

Profiling and capability messages

The protocol used in the invention does not mandates the usage of ISO/IEC 7816-4 however it does not violate ISO/IEC 7816-4 and can coexists with ISO/IEC 7816-4.

Finally, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

We claim:

1. A system for interoperability of a set top box through smart card, said system comprising:
   a set top box (STB) comprising:
      a bi-directional authentication block to mutually authenticate with a smart card (SC), said SC being specific to a service provider, wherein the bidirectional authentication block of the STB is configured to perform:
      obtaining a first set of parameters from the SC;
      evaluating the first set of parameters using a first key to obtain service provider signature, storing the first set of parameters in the internal memory, and transmitting at least one of a certificate and a password to the SC;

verifying second set of parameters being received from the SC using a public key of the service provider, wherein the SC transmits the second set of parameters and a session key upon verifying the at least one of the certificate and the password;

transmitting a third set of parameters, after encrypting using the session key, to the SC; and verifying a fourth set of parameters being received from the SC using the session key to complete the mutual authentication, wherein the SC transmits the fourth set of parameters upon verifying the third set of parameters using the session key;

a config block to receive profiling data from the SC after the mutual authentication, wherein said profiling data configures a conditional access (CA) filter of the STB to transmit conditional access messages along with private data to the SC;

a demodulator block to receive input streams;

said CA filter to extract conditional access messages from the input streams and transmit extracted messages to the smart card SC; and a control word decrypt block to decrypt a control word (CW) received from the smart card and de-scramble audio/video signals in input streams; and said SC communicatively connected to the STB, wherein said SC comprises a config data block to store and to transmit to the STB predefined profiling data specific to the service provider, and a decrypt block to decrypt the extracted messages from the STB to generate said CW, said CW being encrypted and sent to the STB to process the input streams.

2. The system as claimed in claim 1, wherein the conditional access messages comprises entitlement management message (EMM), entitlement control message (ECM) and private data.

3. The system as claimed in claim 1, wherein the decrypt block of the SC comprises EMM decrypt to decrypt entitlement management messages, and ECM decrypt to decrypt entitlement control messages along with decoding of private data to derive said control word.

4. The system as claimed in claim 1, wherein the SC comprises a CW encrypt block to receive data from the decrypt block of the SC and generate encrypted control word.

5. The system as claimed in claim 1, wherein configuring the CA filter is carried out based on said profiling data.

6. The system as claimed in claim 1, wherein the first set of parameters is at least one of service provider's public key, hash algorithm value, an encryption algorithm value and service provider's digital signature.

7. The system as claimed in claim 1, wherein the second set of parameters is at least one of a random number, a first random nonce, one or more arbitrary numbers and public key certificate of SC.

8. The system as claimed in claim 1, wherein the third set of parameters is at least one of a second random nonce and first encrypted value using the session key.

9. The system as claimed in claim 1, wherein the fourth set of parameters is at least one of one or more arbitrary numbers and second encrypted value using the session key.

10. A method for interoperability of set top box (STB) using a smart card (SC), wherein the method comprising:

establishing, by the STB, a secure bi-directional communication channel with the SC by bi-directional mutual authentication protocol and dynamic session key establishment, said SC being specific to a service provider, wherein the bidirectional mutual authentication between the STB and the SC is configured to perform:

obtaining, by the STB, a first set of parameters from the SC;

evaluating, by the STB, the first set of parameters using a first key to obtain service provider signature, storing the first set of parameters in the internal memory, and transmitting at least one of a certificate and a password to the SC;

verifying, by the STB, second set of parameters being received from the SC using a public key of the service provider, wherein the SC transmits the second set of parameters and a session key upon verifying the at least one of the certificate and the password;

transmitting, by the STB, a third set of parameters, after encrypting using the session key, to the SC; and verifying, by the STB, a fourth set of parameters being received from the SC using the session key to complete the mutual authentication, wherein the SC transmits the fourth set of parameters upon verifying the third set of parameters using the session key;

receiving, by the STB, profiling data from the SC using the secure bi-directional communication channel, the profiling data being specific to a service provider;

configuring, by the STB, conditional access (CA) filter of the STB using the profiling data;

extracting, by the STB, conditional access messages from input streams using the CA filter, wherein the extracted messages are transferred to the SC; and receiving and decrypting, by the STB, an encrypted control word (CW) received from the SC, wherein the extracted messages are decrypted by the SC to generate said CW, said decrypted CW is used as a key to carry out audio and video descrambling of input streams received by the STB.

11. The method as claimed in claim 10, wherein the authentication protocol comprises user password and time stamping to enhance security.

12. The method as claimed in claim 10, wherein said configuring a conditional access filter is based on said profiling data.

13. The method as claimed in claim 10, wherein communication between the STB and the smart card comprises bidirectional authentication, secure channel establishment, CA message transfer, and universal CA filter design for extracting the CA messages.

14. The method as claimed in claim 10, wherein the conditional access messages comprises an entitlement management message and an entitlement control message and optional private data (PD).

15. The method as claimed in claim 10, wherein the first set of parameters is at least one of service provider's public key, hash algorithm value, an encryption algorithm value and service provider's digital signature.

16. The method as claimed in claim 10, wherein the second set of parameters is at least one of a random number, a first random nonce, one or more arbitrary numbers and public key certificate of SC.

17. The method as claimed in claim 10, wherein the third set of parameters is at least one of a second random nonce and first encrypted value using the session key.

18. The method as claimed in claim 10, wherein the fourth set of parameters is at least one of one or more arbitrary numbers and second encrypted value using the session key.

* * * * *